United States Patent
Li et al.

(10) Patent No.: US 6,903,904 B2
(45) Date of Patent: Jun. 7, 2005

(54) CPP GMR SYNTHETIC SPIN VALVE ENHANCEMENT

(75) Inventors: Min Li, Fremont, CA (US); Kochan Ju, Fremont, CA (US); Simon Liao, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 276 days.

(21) Appl. No.: 10/277,453

(22) Filed: Oct. 22, 2002

(65) Prior Publication Data

US 2004/0075957 A1 Apr. 22, 2004

(51) Int. Cl.[7] .............................................. G11B 5/39
(52) U.S. Cl. ............... 360/324.11; 360/324; 360/324.1; 29/603.07; 29/603.14; 427/128; 427/131; 427/132; 427/404
(58) Field of Search .................................. 427/128, 131, 427/132, 404; 360/324, 324.1, 324.11; 29/603.07, 603.14

(56) References Cited

U.S. PATENT DOCUMENTS

| | | | |
|---|---|---|---|
| 5,627,704 A | 5/1997 | Lederman et al. | 360/113 |
| 5,668,688 A | 9/1997 | Dykes et al. | 360/113 |
| 6,171,693 B1 | 1/2001 | Lubitz et al. | 428/332 |
| 6,219,211 B1 * | 4/2001 | Gill | 360/324.11 |
| 6,278,589 B1 | 8/2001 | Gill | 360/314 |
| 6,295,187 B1 | 9/2001 | Pinarbasi | 360/324.11 |

* cited by examiner

*Primary Examiner*—Kirsten Jolley
(74) *Attorney, Agent, or Firm*—George D. Saile; Stephen B. Ackerman

(57) ABSTRACT

In current synthetically pinned CPP SV designs, AP2 always makes a negative contribution to the device's GMR since its magnetization direction must be anti-parallel to the pinned layer (AP1). This effect has been reduced by replacing the conventional single layer AP2, that forms part of the synthetic pinned layer, with a multilayer structure into which has been inserted at least one layer of a material such as tantalum that serves to depolarize the spin of electrons that traverse its interfaces. The result is a reduction of said negative contribution by AP2, leading to a significant increase in the GMR ratio.

34 Claims, 1 Drawing Sheet

FIG. 1 – Prior Art

CPP GMR SYNTHETIC SPIN VALVE ENHANCEMENT

FIELD OF THE INVENTION

The invention relates to the general field of magnetic storage devices with particular reference to read heads in disk systems and specifically to magnetically pinned layers therein.

BACKGROUND OF THE INVENTION

The principle governing the operation of most current magnetic read heads is the change of resistivity of certain materials in the presence of a magnetic field (magneto-resistance or MR). Magneto-resistance can be significantly increased by means of a structure known as a spin valve or SV. The resulting increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are shown in FIG. 1. They are capping layer 19, conducting layer 18, low coercivity (free) ferromagnetic layer 17, non-magnetic spacer layer 16, and magnetically pinned ferromagnetic layer 15. In earlier designs layer 15 would have been in direct contact with antiferromagnetic (AFM) pinning layer 12 but, more recently, it is made to be part of a synthetic antiferromagnet. This is formed by sandwiching antiferromagnetic coupling layer 14 between it and another ferromagnetic layer 13 whose direction of magnetization is antiparallel to it. This results in an increase in the size of the pinning field so that a more stable pinned layer is obtained. Hence the description of the device as being synthetically pinned. It is convenient to refer to layers 15 and 13 as AP1 and AP2, respectively (AP=antiparallel). The structure is completed by the presence of seed layer 11 which serves to enhance the magnetic properties of AFM layer 12.

When the free layer is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field. If the direction of the pinned field is parallel to the free layer, electrons passing between the free and pinned layers, suffer less scattering. Thus, the resistance at this state is lower. If, however, the magnetization of the pinned layer is anti-parallel to that of the free layer, electrons moving from one layer into the other will suffer more scattering so the resistance of the structure will increase. The change in resistance of a spin valve is typically 8–20%.

Most GMR devices have been designed so as to measure the resistance of the free layer for current flowing parallel to the film's plane. However, as the quest for ever greater densities continues, devices that measure current flowing perpendicular to the plane (CPP) are also being made. For devices depending on in-plane current, the signal strength is diluted by parallel currents flowing through the other layers of the GMR stack, so these layers should have resistivities as high as possible while the resistance of the leads into and out of the device need not be particularly low. By contrast, in a CPP device, the resistivity of both the leads and the other GMR stack layers dominate and should be as low as possible.

In current synthetically pinned CPP SV designs, AP2 always makes a negative contribution to the device's GMR since its magnetization direction must be anti-parallel to the pinned layer (AP1). The present invention discloses how this negative contribution may be minimized, whereby the CPP GMR as well as dRA can be greatly enhanced.

A routine search of the prior art was performed with the following references of interest being found:

In U.S. Pat. No. 5,668,688 Dykes et al. show a CPP SV process. Lederman et al., in U.S. Pat. No. 5,627,704, show a GMR CCP transducer while Lubitz et al. discuss the CPP GMR in U.S. Pat. No. 6,171,693 B1. U.S. Pat. No. 6,278,589 B1 (Gill) shows a dual GMR having a single AFM layer and, in U.S. Pat. No. 6,295,187 B1, Pinarbasi shows a related SV.

SUMMARY OF THE INVENTION

It has been an object of at least one embodiment of the present invention to provide a magnetic read head.

Another object of at least one embodiment of the present invention has been that said read head be a synthetically pinned GMR tructure.

Still another object of at least one embodiment of the present invention has been to minimize the negative contribution to the GMR ratio that is made by the AP2 layer.

A further object of at least one embodiment of the present invention has been to provide a process for manufacturing said read head.

These objects have been achieved by replacing the conventional single layer AP2, that forms part of the synthetic pinned layer, with a multilayer structure into which has been inserted at least one layer of a material such as tantalum that serves to depolarize the spin of electrons that traverse its interfaces. The result is a reduction of the negative contribution that AP2 normally makes to the GMR ratio, resulting in a significant increase in the latter.

BRIEF DESCRIPTION OF THE DRAWINGS

FIG. 1 is a schematic cross-section of a synthetically pinned CPP SV magnetic read head.

DESCRIPTION OF THE PREFERRED EMBODIMENTS

Figure 2:
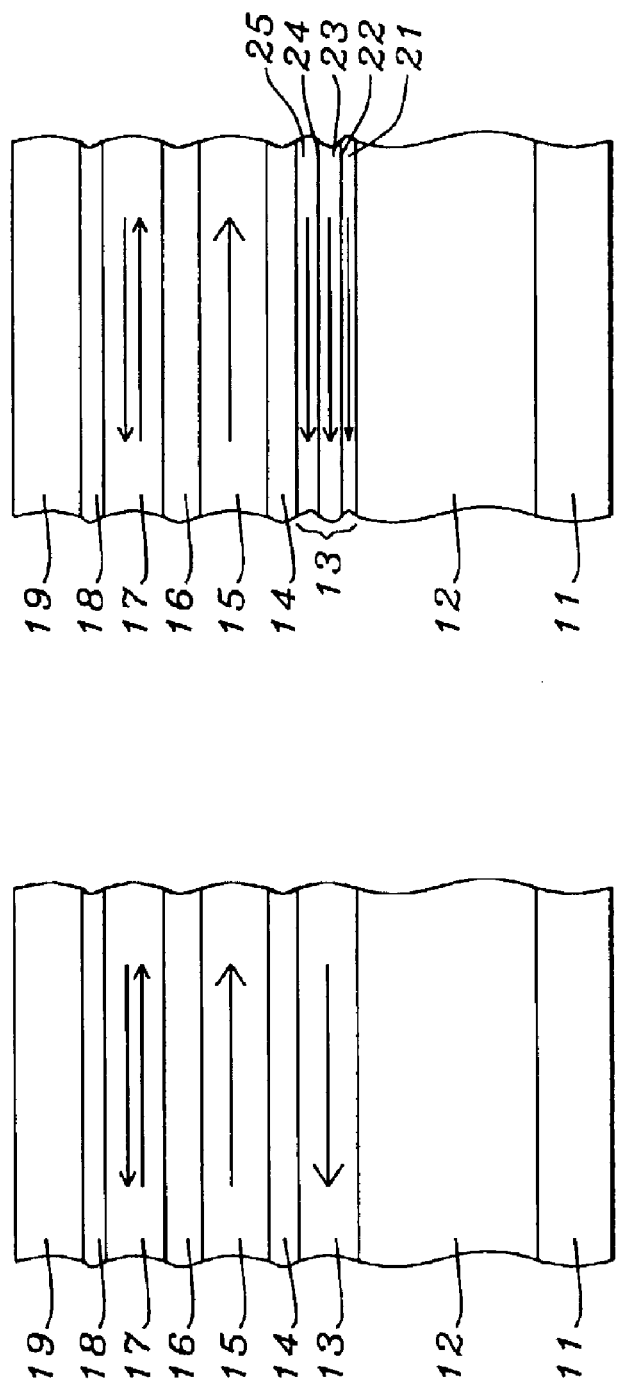
FIG. 2 shows the structure of FIG. 1 modified according to the teachings of the present invention whereby the negative contribution to the GMR of AP2 is significantly reduced.

As has already been noted, the AP2 contribution to the CPP GMR is always negative since it cancels some of the contribution from AP1. This limits the GMR ratio as well as dRA of a synthetic type spin valve. It is known that at the interface of some materials, such as Ta, with a magnetic layer, significant diffusive electron scattering takes place. Thus, when electrons flow through a layer of such material from one magnetic layer into another magnetic layer, the electrons' spin direction, acquired in the first magnetic layer, will be depolarized (randomized).

The present invention applies this effect to reduce AP2's effective thickness thereby increasing CPP GMR and DRA.

We will disclose the present invention through a description of a process for manufacturing it. This description will also make clear the structure of the present invention. Referring now to FIG. 2, the process of the invention begins with the provision of a substrate (not shown) and depositing thereon seed layer 11. The seed layer is any one of NiCr, NiFeCr, Ta, and Ta/NiFe (bilayer) and is deposited to a thickness between about 30 and 70 Angstroms. Then, antiferromagnetic layer 12 is deposited onto said seed layer 11. Layer 12 is any one of MnPt, IrMn, NiMn, and MnPdPt and is deposited to a thickness between about 30 and 200 Angstroms.

Now follows a key feature of the invention. Instead of a single uniform AP2 layer (such as layer 13 in FIG. 1), an electron spin depolarizing layer is inserted. Since the spin scattering occurs at the interfaces, each depolarizing layer is sandwiched between two ferromagnetic (AP2) layers. The more such sandwiches that can be included, the better, the minimum, of course, being one depolarizing layer, but this is limited by the total thickness of the modified AP2 (between about 20 and 60 Angstroms). In the example shown in FIG. 2, depolarizing layers 22 and 24 have been deposited between ferromagnetic layers 21, 23, and 25. The ferromagnetic layers making up the multilayer AP2 structure may be any of $Co_{90}Fe$, $Co_{50}Fe$, NiFe, and CoNiFe and their thicknesses are in the range of from about 5 to about 20 Angstroms. Although each of the depolarizing layers provides two scattering interfaces, each of these layers must be thin enough so as to not significantly weaken the exchange forces operating between layers 21, 23, and 25. The material for the electron spin depolarizing layers could be any of Ta, NiCr, NiFeCr, MnPt, Ti, and Zr, with tantalum being preferred, and its thickness should be between about 0.5 and 5 Angstroms.

Once the multilayer AP2 structure has been completed, antiferromagnetic coupling layer 14 (of Ru or Rh) is deposited (to a thickness between about 3 and 10 Angstroms) onto the topmost ferromagnetic AP2 layer (layer 25 in the example shown in FIG. 2) followed by the deposition of ferromagnetic AP1 layer 15 onto layer 14. Layer 15 may be any of $Co_{90}Fe$, $Co_{50}Fe$, CoFeNi, and CoFeB and it is deposited to a thickness between about 20 and 70 Angstroms.

The device is completed in the usual way with the successive depositions of non-magnetic (usually copper) spacer layer 16, free layer 17 (typically $Co_{90}Fe$, CoFeNi, or NiFe/CoFe (bilayer)), deposited to a thickness between about 20 and 60 Angstroms.

By means of a standard anneal in a magnetic field, AFM layer 12 is magnetized which results in the permanent pinning of AP1 (layer 15).

Results:

When current flows through the CPP GMR structure, since the Ta layer will depolarize the electrons, the effective AP2 thickness will be reduced to about 10 Å i.e., only the 10 Å of CoFe closest to the AFM coupling layer will make a (negative) contribution to CPP GMR.

In TABLE I below, we provide some experimental results that confirm the efficacy of the present invention:

TABLE I

| | | Mask Size | | |
|---|---|---|---|---|
| | | 0.24 × 0.24 | 0.3 × 0.3 | 0.4 × 0.4 |
| | | | Device Size | |
| | | 0.2 × 0.2 | 0.28 × 0.28 | 0.38 × 0.38 |
| | | | Device Area | |
| Wafer | | 0.040 | 0.078 | 0.144 |
| A1 | Rmax(ohm) | 2.132 | 1.109 | 0.694 |
| | Rmin(ohm) | 2.099 | 1.092 | 0.683 |
| | DR(ohm) | 0.033 | 0.017 | 0.011 |
| | DR/R(%) | 1.578 | 1.559 | 1.645 |
| | RA(Ohmum$^2$) | 0.0846 | 0.0863 | 0.0994 |
| | DRA(Ohmum$^2$) | 0.0013 | 0.0013 | 0.0016 |
| AN1 | Rmax | 1.666 | 0.980 | 0.604 |
| | Rmin | 1.597 | 0.953 | 0.587 |
| | DR | 0.069 | 0.027 | 0.016 |
| | DR/R(%) | 4.303 | 2.847 | 2.777 |
| | RA(Ohmum$^2$) | 0.0653 | 0.0757 | 0.0860 |
| | DRA Ohmum$^2$ | 0.0027 | 0.0021 | 0.0024 |
| AN2 | Rmax | 1.628 | 0.991 | 0.673 |
| | Rmin | 1.558 | 0.954 | 0.652 |
| | DR | 0.071 | 0.037 | 0.022 |
| | DR/R(%) | 4.544 | 3.834 | 3.305 |
| | RA(Ohmum$^2$) | 0.0637 | 0.0763 | 0.0957 |
| | DRA Ohmum$^2$ | 0.0028 | 0.0029 | 0.0031 |

CPP film structures:
A1: NiCr20/NiFe40/MP120/FeCo20/Rub/FeCo30/Cu26/FeCo30/Cu26/FeCo30/Ru8/FeCo20/MP120/Cu150
AN1: NiCr20/NiFe4O/MP120/[FeCo7/NiCrI.5]2/FeCo7/Ru8/FeCo30/Cu26/FeCo30/Cu26/FeCo30/Ru8/[FeCo7/NiCr1.5]2FeCo7/MP120/Cu150
AN2: NiCr20/NiFe4O/MP1204FeCo7/NiCr3]2FeCo7/Ru8/FeCo30/Cu26/FeCo30/Cu26/FeCo30/Ru8[FeCo7/NiCr3]2FeCo7/MP120/Cu150

As can be seen, NiCr insertion in AP2 increased CPP, GMR, and DRA about 60 to 100% over reference structure A1.

As already noted, Ta can be replaced by NiCr, Ti, Zr, etc or other materials that show depolarizing effect of electron spin. It is also noted here that insertion of the depolarizing layer into the AP2 stack can be effected in various ways. For example their thickness could vary from one position in the stack to another as could that of the ferromagnetic layers making up the stack.

Although we have described the invention in terms of a single bottom synthetic spin valve, the invention may be applied equally well to CPP top spin valves, to dual spin valves, and to other related multilayer structures such as magnetic tunnel junctions.

What is claimed is:

1. A CPP magnetic read head, comprising:
   a seed layer on a substrate;
   an antiferromagnetic layer on said seed layer;
   an AP2 multilayer structure on said antiferromagnetic layer;
   said multilayer structure further comprising at least two ferromagnetic layers, each of which contacts, and is separated from the other, by an electron spin depolarizing layer;
   an antiferromagnetic coupling layer on a topmost ferromagnetic layer;
   a ferromagnetic AP1 layer on said antiferromagnetic coupling layer;
   a non-magnetic spacer layer on said AP1 layer;
   a ferromagnetic free layer on said spacer layer;
   a conducting layer on said ferromagnetic free layer; and
   a capping layer on said conducting layer.

2. The CPP magnetic read head described in claim 1 wherein said seed layer is selected from the group consisting of NiCr, NiFeCr, Ta, and Ta/NiFe and has a thickness between about 30 and 70 Angstroms.

3. The CPP magnetic read head described in claim 1 wherein said antiferromagnetic layer is selected from the group consisting of MnPt, IrMn, NiMn, and MnPdPt.

4. The CPP magnetic read head described in claim 1 wherein said antiferromagnetic layer has a thickness between about 30 and 200 Angstroms.

5. The CPP magnetic read head described in claim 1 wherein there is one electron spin depolarizing layer.

6. The CPP magnetic read head described in claim 1 wherein there are two electron spin depolarizing layers.

7. The CPP magnetic read head described in claim 1 wherein each ferromagnetic layer is selected from the group consisting of $Co_{90}Fe_{10}$, $Co_{50}Fe_{50}$, NiFe, and CoNiFe.

8. The CPP magnetic read head described in claim 1 wherein each ferromagnetic layer in said AP2 multilayer structure has a thickness between about 5 and 20 Angstroms.

9. The CPP magnetic read head described in claim 1 wherein each electron spin depolarizing layer is selected from the group consisting of Ta, NiCr, NiFeCr, MnPt, Ti, Zr.

10. The CPP magnetic read head described in claim 1 wherein each electron spin depolarizing layer in said AP2 multilayer structure has a thickness between about 0.5 and 5 Angstroms.

11. The CPP magnetic read head described in claim 1 wherein said AP2 multilayer structure has a total thickness between about 20 and 60 Angstroms.

12. The CPP magnetic read head described in claim 1 wherein said AP1 layer is selected from the group consisting of $Co_{90}Fe_{10}$, $Co_{50}Fe_{50}$, and CoNiFe.

13. The CPP magnetic read head described in claim 1 wherein said AP1 layer has a thickness between about 20 and 70 Angstroms.

14. The CPP magnetic read head described in claim 1 wherein said antiferromagnetic coupling layer is selected from the group consisting of Ru and Rh.

15. The CPP magnetic read head described in claim 1 wherein said antiferromagnetic coupling layer has a thickness between about 3 and 10 Angstroms.

16. The CPP magnetic read head described in claim 1 wherein said free layer is selected from the group consisting of $Co_{90}Fe_{10}$, CoFeNi, and NiFe/CoFe.

17. The CPP magnetic read head described in claim 1 wherein said free layer has a thickness between about 20 and 60 Angstroms.

18. A process to manufacture a CPP magnetic read head, comprising:

depositing a seed layer on a substrate;

depositing an antiferromagnetic layer on said seed layer; then, with no intervening steps, depositing in succession:

(a) an AP2 ferromagnetic layer; and (b) an electron spin depolarizing layer;

then repeating steps (a) and (b) zero or more times; then on an electron spin depolarizing layer, depositing a topmost ferromagnetic AP2 layer;

depositing an antiferromagnetic coupling layer on said topmost ferromagnetic AP2 layer;

depositing a ferromagnetic AP1 layer on said antiferromagnetic coupling layer;

depositing a non-magnetic spacer layer on said AP1 layer;

depositing a ferromagnetic free layer on said spacer layer;

depositing a conducting layer on said ferromagnetic free layer; and depositing a capping layer on said conducting layer.

19. The process described in claim 18 wherein said seed layer is selected from the group consisting of NiCr, NiFeCr, Ta, and Ta/NiFe.

20. The process described in claim 18 wherein said antiferromagnetic layer is selected from the group consisting of MnPt, IrMn, NiMn, and MnPdPt.

21. The process described in claim 18 wherein said antiferromagnetic layer is deposited to a thickness between about 30 and 200 Angstroms.

22. The process described in claim 18 wherein steps (a) and (b) are repeated zero times.

23. The process described in claim 18 wherein steps (a) and (b) are repeated once.

24. The process described in claim 18 wherein each ferromagnetic layer is selected from the group consisting of $Co_{90}Fe_{10}$, $Co_{50}Fe_{50}$, NiFe, and CoNiFe.

25. The process described in claim 18 wherein each ferromagnetic layer in said AP2 multilayer structure is deposited to a thickness between about 5 and 20 Angstroms.

26. The process described in claim 18 wherein each electron spin depolarizing layer is selected from the group consisting of Ta, NiCr, NiFeCr, MnPt, Ti, Zr.

27. The process described in claim 18 wherein each electron spin depolarizing layer in said AP2 multilayer structure is deposited to a thickness between about 0.5 and 5 Angstroms.

28. The process described in claim 18 wherein said AP2 multilayer structure is deposited to a total thickness between about 20 and 60 Angstroms.

29. The process described in claim 18 wherein said AP1 layer is selected from the group consisting of $Co_{90}Fe_{10}$, $Co_{50}Fe_{50}$, and CoNiFe.

30. The process described in claim 18 wherein said AP1 layer is deposited to a thickness between about 20 and 70 Angstroms.

31. The process described in claim 18 wherein said antiferromagnetic coupling layer is selected from the group consisting of Ru and Rh.

32. The process described in claim 18 wherein said antiferromagnetic coupling layer is deposited to a thickness between about 3 and 10 Angstroms.

33. The process described in claim 18 wherein said free layer is selected from the group consisting of $Co_{90}Fe_{10}$, CoNiFe, NiFe/CoFe.

34. The process described in claim 18 wherein said free layer is deposited to a thickness between about 20 and 60 Angstroms.

* * * * *